United States Patent
Li et al.

(10) Patent No.: US 9,646,225 B2
(45) Date of Patent: May 9, 2017

(54) DEFOCUS ESTIMATION FROM SINGLE IMAGE BASED ON LAPLACIAN OF GAUSSIAN APPROXIMATION

(71) Applicant: SONY CORPORATION, Tokyo (JP)

(72) Inventors: Pingshan Li, Sunnyvale, CA (US); Jianing Wei, Cupertino, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/832,781

(22) Filed: Aug. 21, 2015

(65) Prior Publication Data

US 2017/0053187 A1    Feb. 23, 2017

(51) Int. Cl.
*H04N 5/232* (2006.01)
*G06K 9/62* (2006.01)
*G06T 5/00* (2006.01)

(52) U.S. Cl.
CPC .............. *G06K 9/6215* (2013.01); *G06T 5/00* (2013.01); *H04N 5/23212* (2013.01); *G06T 2207/30168* (2013.01)

(58) Field of Classification Search
CPC .......... G06K 9/6215; G06K 9/18; G06K 9/40; G06K 2209/01; G06T 5/00; G06T 2207/30168; G06T 5/005; G06T 5/001; G06T 2207/20192; G06T 2207/20056; G06T 2207/20021; G06T 2207/20201; G06T 7/0069; G06T 2207/10148; G06T 2207/10004; G06T 2207/10016; G06T 2207/20024; H04N 5/23212
See application file for complete search history.

(56) References Cited

U.S. PATENT DOCUMENTS

| | | | |
|---|---|---|---|
| 4,905,296 A | 2/1990 | Nishihara | |
| 5,899,999 A | 5/1999 | De Bonet | |
| 7,715,018 B2 | 5/2010 | Gharib et al. | |
| 8,368,964 B2 | 2/2013 | Xu et al. | |
| 8,867,856 B2 | 10/2014 | Wang et al. | |
| 2009/0245651 A1* | 10/2009 | Friedhoff | G06T 7/0081 382/199 |
| 2009/0268985 A1* | 10/2009 | Wong | G06K 9/209 382/299 |
| 2010/0066874 A1* | 3/2010 | Ishiga | G06T 5/002 348/252 |
| 2010/0080482 A1 | 4/2010 | Wong et al. | |
| 2011/0150447 A1* | 6/2011 | Li | G06T 7/0069 396/104 |

(Continued)

FOREIGN PATENT DOCUMENTS

WO    2009156329 A1    12/2009

OTHER PUBLICATIONS

Emanuela Boros et al., "UAIC:Participation in ImageCLEF2009 Robot Vision Task", http://www.imageclef.org/.

(Continued)

*Primary Examiner* — Roberto Velez
*Assistant Examiner* — Tuan Le
(74) *Attorney, Agent, or Firm* — Haverstock & Owens LLP (57) ABSTRACT

A defocus estimation algorithm is described herein. The defocus estimation algorithm utilizes a single image. A Laplacian of Gaussian approximation is determined by computing a difference of Gaussian. Defocus blur is able to be estimated by computing a blur difference between two images using the difference of Gaussian.

21 Claims, 4 Drawing Sheets

(56) References Cited

U.S. PATENT DOCUMENTS

| | | | | |
|---|---|---|---|---|
| 2011/0249173 A1* | 10/2011 | Li | ...................... | H04N 5/23212 348/349 |
| 2012/0243792 A1* | 9/2012 | Kostyukov | ............. | G06T 5/003 382/199 |
| 2013/0182152 A1* | 7/2013 | Li | ...................... | H04N 5/23212 348/241 |
| 2013/0258096 A1* | 10/2013 | Ali | ........................ | G06T 7/0069 348/135 |
| 2013/0300860 A1* | 11/2013 | Komatsu | ............... | G06T 7/0069 348/135 |
| 2015/0154742 A1* | 6/2015 | Bocharov | ................ | G06K 9/18 382/167 |

OTHER PUBLICATIONS

Mohd Ahmed et al., "Criminal Photograph Retrieval Based on Forensic Face Sketch Using Scale Invariant Feature Transform", Mar. 26-28, 2012, http://www.icmis.net/ictbm/ictbm12/ICTBM12CD/pdf/D2017-DONE.PDF., www.evalueserve.com.

Attached please find the International Search Report for the PCT/US2016/045841 application.

Jing Wan et al., "An Iris Image Quality Assessment Method Based on Laplacian of Gaussian Operation", MVA2007, LAPR Conference on Machine Vision Applications, May 16-18, 2007, Tokyo, Japan, pp. 248-251.

Bolan Su et al., "Blurred Image Region Detection and Classification", Proceeding of the 19th ACM International Conference on Multimedia ; 1397-1400, 2011.

\* cited by examiner

DEFOCUS ESTIMATION FROM SINGLE IMAGE BASED ON LAPLACIAN OF GAUSSIAN APPROXIMATION

FIELD OF THE INVENTION

The present invention relates to the field of imaging. More specifically, the present invention relates to defocus estimation.

BACKGROUND OF THE INVENTION

When images are acquired by a device such as a digital camera, there are often defects with the image such as blurring or defocusing. While there are several methods for attempting to correct blur, they do not sufficiently correct blur and defocusing.

SUMMARY OF THE INVENTION

A defocus estimation algorithm is described herein. The defocus estimation algorithm utilizes a single image. A Laplacian of Gaussian approximation is determined by computing a difference of Gaussian. Defocus blur is able to be estimated by computing a blur difference between two images using the difference of Gaussian.

In one aspect, a method programmed in a non-transitory memory of a device comprises acquiring an image, computing a Laplacian of a Gaussian of the image by computing a difference of Gaussian of the image and determining an estimated defocus amount of the image based on the difference of Gaussian of the image. The estimated defocus amount is determined using iterative convolution. The estimated defocus amount is determined using a lookup table. The method further comprises detecting a focus of the image. Detecting the focus of the image comprises comparing an iteration number with a predefined threshold. The image is in focus when the iteration number is smaller than the threshold. The method further comprises denoising the image. The device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.

In another aspect, a system programmed in a memory of a device comprises an acquisition module configured for acquiring an image, a computing module configured for computing a Laplacian of a Gaussian of the image by computing a difference of Gaussian of the image and a determination module configured for determining an estimated defocus amount of the image based on the difference of Gaussian of the image. The estimated defocus amount is determined using iterative convolution. The estimated defocus amount is determined using a lookup table. The system further comprises detecting a focus of the image. Detecting the focus of the image comprises comparing an iteration number with a predefined threshold. The image is in focus when the iteration number is smaller than the threshold. The system further comprises denoising the image.

In another aspect, an apparatus comprises a non-transitory memory for storing an application, the application for: acquiring an image, computing a Laplacian of a Gaussian of the image by computing a difference of Gaussian of the image and determining an estimated defocus amount of the image based on the difference of Gaussian of the image and a processing component coupled to the memory, the processing component configured for processing the application. The estimated defocus amount is determined using iterative convolution. The estimated defocus amount is determined using a lookup table. The apparatus further comprises detecting a focus of the image. Detecting the focus of the image comprises comparing an iteration number with a predefined threshold. The image is in focus when the iteration number is smaller than the threshold. The apparatus further comprises denoising the image.

In another aspect, a camera device comprises a sensor for acquiring an image, a non-transitory memory for storing an application, the application for: computing a Laplacian of a Gaussian of the image by computing a difference of Gaussian of the image and determining an estimated defocus amount of the image based on the difference of Gaussian of the image and a processing component coupled to the memory, the processing component configured for processing the application. The estimated defocus amount is determined using iterative convolution. The estimated defocus amount is determined using a lookup table. The application is configured for detecting a focus of the lens of the image. Detecting the focus of the image comprises comparing an iteration number with a predefined threshold. The image is in focus when the iteration number is smaller than the threshold. The application is configured for denoising the image.

DETAILED DESCRIPTION OF THE PREFERRED EMBODIMENT

Figure 1:
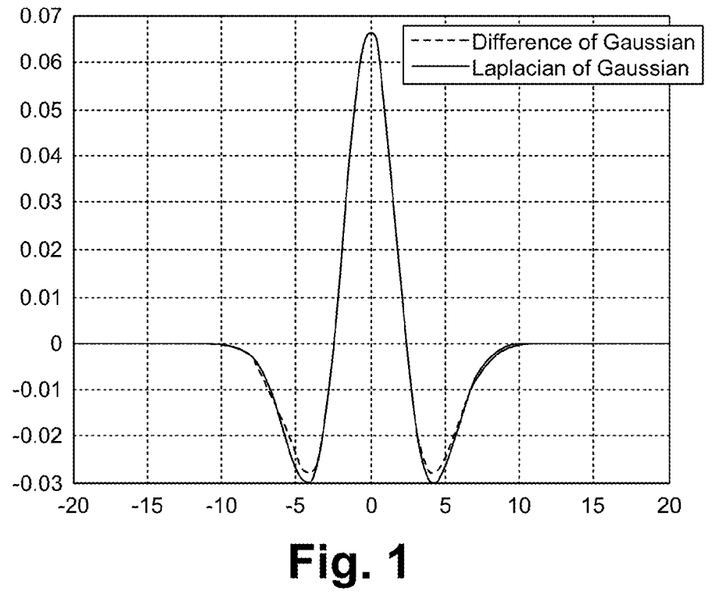
FIG. 1 illustrates a negative second derivative of the Gaussian function according to some embodiments.

An approximation between a Laplacian of Gaussian (LoG) and Difference of Gaussian (DoG) to estimate defocus using a single image is described herein. The second derivative of a Gaussian function is the Laplacian of the Gaussian. A negative second derivative of the Gaussian function is shown in FIG. 1.
Gaussian function:

$$G(x, \sigma^2) = \frac{1}{\sigma\sqrt{2\pi}} \exp\left(-\frac{x^2}{2\sigma^2}\right)$$

A heat diffusion equation is:

$$\sigma G''(x, \sigma^2) = \frac{\partial G(x, \sigma^2)}{\partial \sigma} \approx \frac{G(x, \sigma_2^2) - G(x, \sigma_1^2)}{\sigma_2 - \sigma_1}$$

$$At\, x = 0,\, \sigma G''(0, \sigma^2) = \frac{1}{\sigma^2 \sqrt{2\pi}}$$

$$\frac{G(0, \sigma_2^2) - G(0, \sigma_1^2)}{\sigma_2 - \sigma_1} = \frac{\frac{1}{\sigma_2\sqrt{2\pi}} - \frac{1}{\sigma_1\sqrt{2\pi}}}{\sigma_2 - \sigma_1} = -\frac{1}{\sigma_1 \sigma_2 \sqrt{2\pi}}$$

By choosing $\sigma = \sqrt{\sigma_1 \sigma_2}$, this gives a perfect match at x=0. In a further approximation, the DoG is:

$$G(x, \sigma_2^2) - G(x, \sigma_1^2) \approx (\sigma_2 - \sigma_1)\sqrt{\sigma_1\sigma_2}\, G''(x, \sigma_1\sigma_2)$$

$$\approx (\sigma_2 - \sigma_1)\left(\frac{\sigma_1 + \sigma_2}{2}\right) G''(x, \sigma_1\sigma_2)$$

$$= \left(\frac{\sigma_2^2 - \sigma_1^2}{2}\right) G''(x, \sigma_1\sigma_2)$$

A model for defocus blur is given by:

$b = f \otimes G(x, \sigma^2)$ where,
b is an out-of-focus image,
f is an in-focus image,
G is a Gaussian Point Spread Function (PSF), and
$\otimes$ denotes convolution.

The goal is to estimate $\sigma$ from b.

$b_a = b \otimes G(x, \sigma_a^2) = f \otimes G(x, \sigma^2 + \sigma_a^2)$

Reblur: $b_b = b \otimes G(x, \sigma_b^2) = f \otimes G(x, \sigma^2 + \sigma_b^2)$ $\sigma_b > \sigma_a$ The blur difference approximation is computed by:
Consider blur difference:

$b - b_a = f \otimes (G(x, \sigma^2) - G(x, \sigma^2 + \sigma_a^2))$ where,
f is the in-focus image,
and the subtraction is the difference of Gaussian.
The following is the Laplacian of Gaussian approximation:

$$b - b_a \approx \frac{\sigma_a^2}{2} f \otimes \left[-G''\left(x, \sqrt{\sigma^2(\sigma^2 + \sigma_a^2)}\right)\right]$$

similarly, $$b - b_b \approx \frac{\sigma_b^2}{2} f \otimes \left[-G''\left(x, \sqrt{\sigma^2(\sigma^2 + \sigma_b^2)}\right)\right]$$

When $\sigma_b > \sigma_a$, there exists $\sigma_d$ so that $[-G''(x, \sqrt{\sigma^2(\sigma^2 + \sigma_a^2)})] \otimes G(x, \sigma_d^2) = [-G''(x, \sqrt{\sigma^2(\sigma^2 + \sigma_b^2)})]$ where $\sigma_d^2 = \sqrt{\sigma^2(\sigma^2 + \sigma_b^2)} - \sqrt{\sigma^2(\sigma^2 + \sigma_a^2)}$ Once $\sigma_d$ is determined, $\sigma$ is able to solved from the equation.

Implementation

To determine $\sigma_d$, it is equivalent to finding a Gaussian function G so that:

$$(b - b_a) \otimes G(x, \sigma_d^2) \approx \frac{\sigma_a^2}{\sigma_b^2}(b - b_b)$$

or, $\sigma_d$ is found to minimize:

$$\left\| (b - b_a) \otimes G(x, \sigma_d^2) - \frac{\sigma_a^2}{\sigma_b^2}(b - b_b) \right\|$$

This is able to performed using the iterative convolution method:

$$(b - b_a) \otimes k \otimes k \ldots \otimes k \to \frac{\sigma_a^2}{\sigma_b^2}(b - b_b)$$

where k is a Gaussian kernel with a small variance.

Figure 2:
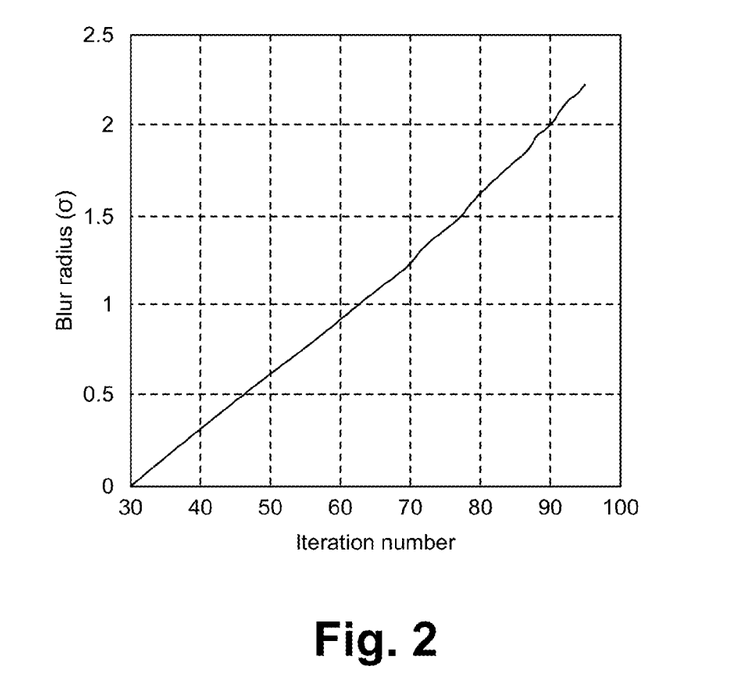
FIG. 2 illustrates a relationship between iteration number and defocus blur radius obtained from a step edge (calibration image) according to some embodiments.

FIG. 2 illustrates a relationship between iteration number and defocus blur radius obtained from a step edge (calibration image). The curve is able to be used as a look up table to determine the blur radius from an iteration number for test images.

Denoising

Noise is able to affect the blur matching performance, particularly when the amount of blur increases. Performance is able to be improved by denoising, which is done by applying a blur filter to the captured image before iterative convolution. The same amount of denoising is applied to the calibration image and test images.

Figure 3:
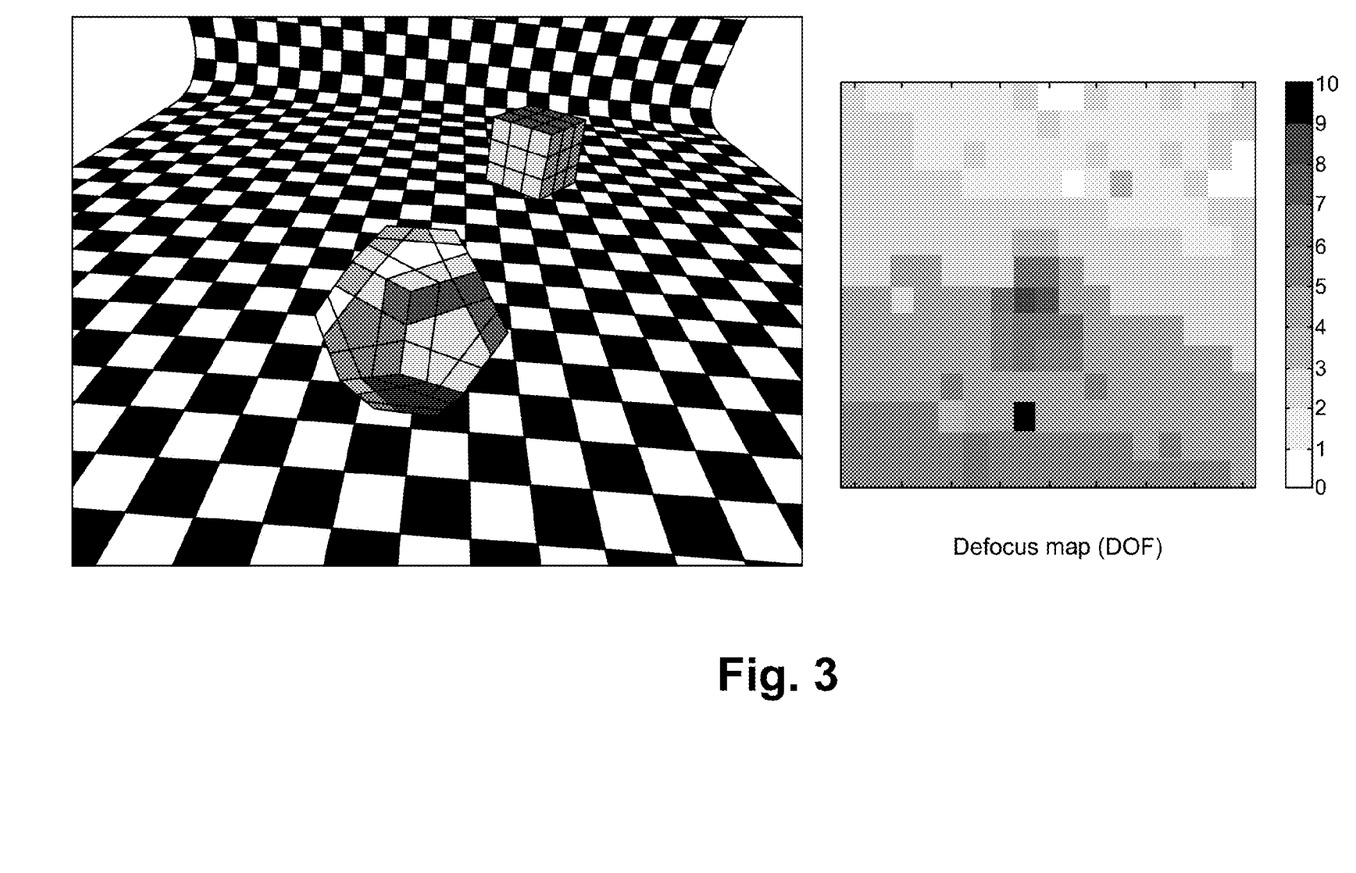
FIG. 3 illustrates a defocus map of an image according to some embodiments.

FIG. 3 illustrates a defocus map of an image according to some embodiments. The defocus map is generated using the defocus estimation method as described herein.

Focus Detection

Focus detection is used to determine whether the image is in focus using the single image. The amount of blur is not required for this application. Focus detection is performed by comparing the iteration number with a predefined threshold. The image is in focus when the iteration number is smaller than the threshold. Otherwise, it is out of focus. Denoising is turned off when only focus detection is required, since denoising makes it difficult to distinguish small blur and in-focus. Small $\sigma_b/\sigma_a$ ratios are preferable for focus detection.

Figure 4:
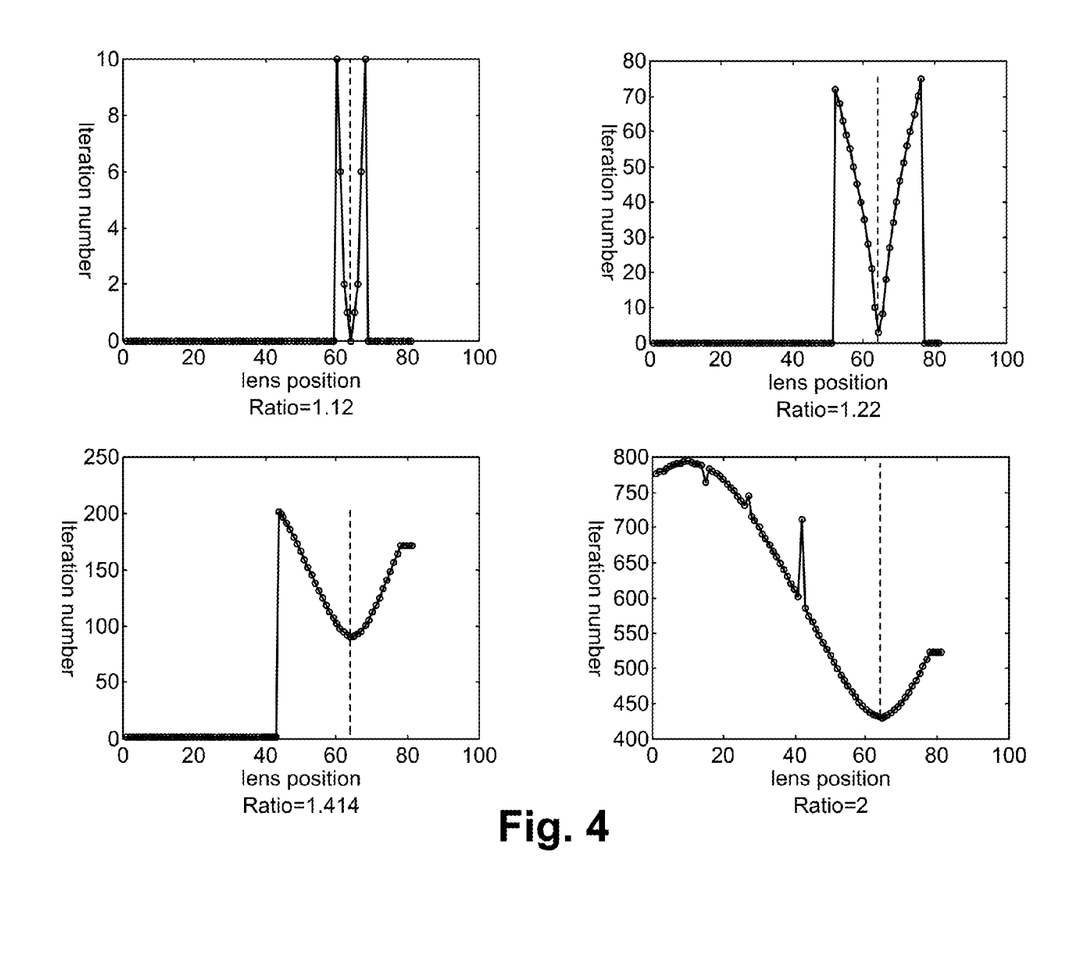
FIG. 4 illustrates graphs of performance with various ratios according to some embodiments.

FIG. 4 illustrates graphs of the performance of the focus estimation method with various $\sigma_b/\sigma_a$ ratios.

Figure 5:
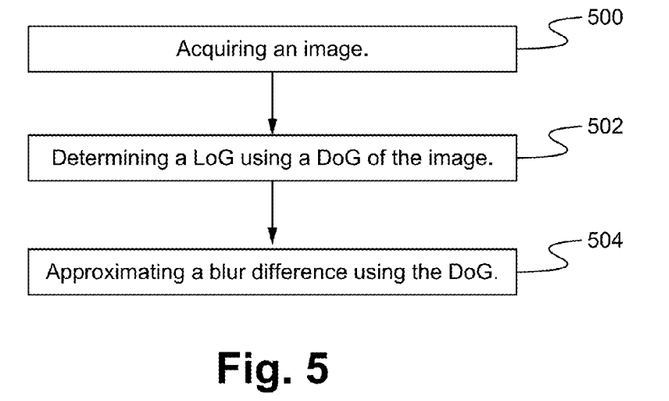
FIG. 5 illustrates a flowchart of a method of estimating defocus according to some embodiments.

FIG. 5 illustrates a flowchart of a method of estimating defocus according to some embodiments. In the step 500, a single image is acquired. In the step 502, a LoG is determined using a DoG of the single image information. In the step 504, an approximation of blur difference (or defocus) is determined using the DoG. In some embodiments, the blur difference is determined using an iterative convolution method. In some embodiments, the blur difference is approximated between the first image and a second image is determined using the DoG. In some embodiments, the second image is a test image. In some embodiments, the second image is a blurred image of the first image. The method does not use division and maximal operators; and therefore, is noise robust. In some embodiments, additional or fewer steps are implemented.

Figure 6:
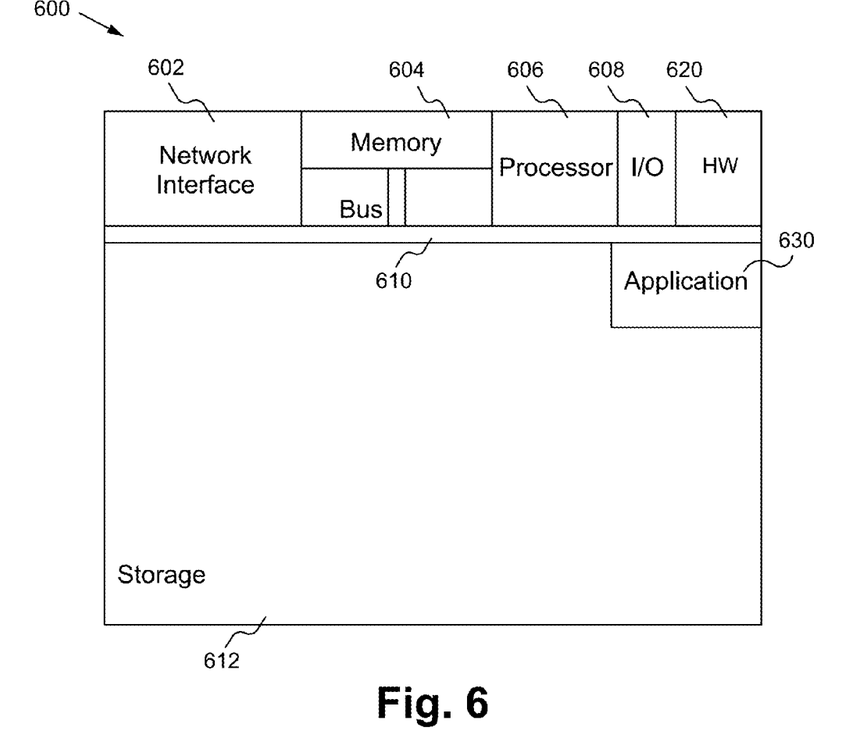
FIG. 6 illustrates a block diagram of an exemplary computing device configured to implement the estimating defocus method according to some embodiments.

FIG. 6 illustrates a block diagram of an exemplary computing device configured to implement the estimating defocus method according to some embodiments. The computing device 600 is able to be used to acquire, store, compute, process, communicate and/or display information such as images and videos. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, High Definition disc/drive, ultra-HD drive, flash memory card or any other storage device. The computing device 600 is able to include one or more network interfaces 602. An example of a network interface includes a network card connected to an Ethernet or other type of LAN. The I/O device(s) 608 are able to include one or more of the following: keyboard, mouse, monitor, screen, printer, modem, touchscreen, button interface and other devices. Estimating defocus application(s) 630 used to perform the estimating defocus method are likely to be stored in the storage device 612 and memory 604 and processed as applications are typically processed. More or fewer components shown in FIG. 6 are able to be included in the computing device 600. In some embodiments, estimating defocus hardware 620 is included. Although the computing device 600 in FIG. 6 includes applications 630 and hardware 620 for the estimating defocus method, the estimating defocus method is able to be implemented on a computing device in hardware, firmware, software or any combination thereof. For example, in some embodiments, the estimating defocus applications 630 are programmed in a memory and executed using a processor. In another example, in some embodiments, the estimating defocus hardware 620 is programmed hardware logic including gates specifically designed to implement the estimating defocus method.

In some embodiments, the estimating defocus application(s) 630 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch) or any other suitable computing device.

To utilize the estimating defocus method, a device such as a digital camera is able to be used to acquire an image. The estimating defocus method is automatically used when performing image processing. The estimating defocus method is able to be implemented automatically without user involvement.

In operation, the estimating defocus method improves image processing efficiency. By using a single image and a LoG and DoG, efficiency is improved.

Some Embodiments of Defocus Estimation from Single Image Based on Laplacian of Gaussian Approximation 1. A method programmed in a non-transitory memory of a device comprising:
   a. acquiring an image;
   b. computing a Laplacian of a Gaussian of the image by computing a difference of Gaussian of the image; and
   c. determining an estimated defocus amount of the image based on the difference of Gaussian of the image.
2. The method of clause 1 wherein the estimated defocus amount is determined using iterative convolution.
3. The method of clause 2 wherein the estimated defocus amount is determined using a lookup table.
4. The method of clause 2 further comprising detecting a focus of the image.
5. The method of clause 4 wherein detecting the focus of the image comprises comparing an iteration number with a predefined threshold.
6. The method of clause 5 wherein the image is in focus when the iteration number is smaller than the threshold.
7. The method of clause 1 further comprising denoising the image.
8. The method of clause 1 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.
9. A system programmed in a memory of a device comprising:
   a. an acquisition module configured for acquiring an image;
   b. a computing module configured for computing a Laplacian of a Gaussian of the image by computing a difference of Gaussian of the image; and
   c. a determination module configured for determining an estimated defocus amount of the image based on the difference of Gaussian of the image.
10. The system of clause 9 wherein the estimated defocus amount is determined using iterative convolution.
11. The system of clause 10 wherein the estimated defocus amount is determined using a lookup table.
12. The system of clause 10 further comprising detecting a focus of the image.
13. The system of clause 12 wherein detecting the focus of the image comprises comparing an iteration number with a predefined threshold.
14. The system of clause 13 wherein the image is in focus when the iteration number is smaller than the threshold.
15. The system of clause 9 further comprising denoising the image.
16. An apparatus comprising:
   a. a non-transitory memory for storing an application, the application for:
      i. acquiring an image;
      ii. computing a Laplacian of a Gaussian of the image by computing a difference of Gaussian of the image; and
      iii. determining an estimated defocus amount of the image based on the difference of Gaussian of the image; and b. a processing component coupled to the memory, the processing component configured for processing the application.

17. The apparatus of clause 16 wherein the estimated defocus amount is determined using iterative convolution.
18. The apparatus of clause 17 wherein the estimated defocus amount is determined using a lookup table.
19. The apparatus of clause 17 further comprising detecting a focus of the image.
20. The apparatus of clause 19 wherein detecting the focus of the image comprises comparing an iteration number with a predefined threshold.
21. The apparatus of clause 20 wherein the image is in focus when the iteration number is smaller than the threshold.
22. The apparatus of clause 16 further comprising denoising the image.
23. A camera device comprising:
   a. a sensor for acquiring an image;
   b. a non-transitory memory for storing an application, the application for:
      i. computing a Laplacian of a Gaussian of the image by computing a difference of Gaussian of the image; and
      ii. determining an estimated defocus amount of the image based on the difference of Gaussian of the image; and
   c. a processing component coupled to the memory, the processing component configured for processing the application.
24. The camera device of clause 23 wherein the estimated defocus amount is determined using iterative convolution.
25. The camera device of clause 24 wherein the estimated defocus amount is determined using a lookup table.
26. The camera device of clause 24 wherein the application is configured for detecting a focus of the lens of the image.
27. The camera device of clause 26 wherein detecting the focus of the image comprises comparing an iteration number with a predefined threshold.
28. The camera device of clause 27 wherein the image is in focus when the iteration number is smaller than the threshold.
29. The camera device of clause 23 wherein the application is configured for denoising the image.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   acquiring an image;
   computing a Laplacian of a Gaussian of the image by computing a difference of Gaussian of the image;
   determining an estimated defocus amount of the image based on the difference of Gaussian of the image, wherein the estimated defocus amount is determined using iterative convolution involving a Gaussian kernel with a small variance, wherein the estimated defocus amount is determined using a lookup table, further wherein the lookup table is based on a curve related to a relationship between blur radius and iteration number; and
   focusing the device based on the estimated defocus amount of the image.
2. The method of claim 1 further comprising detecting a focus of the image.
3. The method of claim 2 wherein detecting the focus of the image comprises comparing an iteration number with a predefined threshold.
4. The method of claim 3 wherein the image is in focus when the iteration number is smaller than the threshold.
5. The method of claim 1 further comprising denoising the image.
6. The method of claim 1 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.
7. A system programmed in a memory of a device comprising:
   an acquisition module configured for acquiring an image;
   a computing module configured for computing a Laplacian of a Gaussian of the image by computing a difference of Gaussian of the image;
   a determination module configured for determining an estimated defocus amount of the image based on the difference of Gaussian of the image, wherein the estimated defocus amount is determined using iterative convolution involving a Gaussian kernel with a small variance, wherein the estimated defocus amount is determined using a lookup table, further wherein the lookup table is based on a curve related to a relationship between blur radius and iteration number; and
   a focus module configured for focusing the device based on the estimated defocus amount of the image.
8. The system of claim 7 further comprising detecting a focus of the image.
9. The system of claim 8 wherein detecting the focus of the image comprises comparing an iteration number with a predefined threshold.
10. The system of claim 9 wherein the image is in focus when the iteration number is smaller than the threshold.
11. The system of claim 7 further comprising denoising the image.
12. An apparatus comprising:
   a non-transitory memory for storing an application, the application for:
   acquiring an image;
   computing a Laplacian of a Gaussian of the image by computing a difference of Gaussian of the image;
   determining an estimated defocus amount of the image based on the difference of Gaussian of the image, wherein the estimated defocus amount is determined using iterative convolution involving a Gaussian kernel with a small variance, wherein the estimated defocus amount is determined using a lookup table, further wherein the lookup table is based on a curve related to a relationship between blur radius and iteration number; and
   focusing the apparatus based on the estimated defocus amount of the image; and a processing component coupled to the memory, the processing component configured for processing the application.

13. The apparatus of claim 12 further comprising detecting a focus of the image.

14. The apparatus of claim 13 wherein detecting the focus of the image comprises comparing an iteration number with a predefined threshold.

15. The apparatus of claim 14 wherein the image is in focus when the iteration number is smaller than the threshold.

16. The apparatus of claim 12 further comprising denoising the image.

17. A camera device comprising:
a sensor for acquiring an image;
a non-transitory memory for storing an application, the application for:
computing a Laplacian of a Gaussian of the image by computing a difference of Gaussian of the image;
determining an estimated defocus amount of the image based on the difference of Gaussian of the image, wherein the estimated defocus amount is determined using iterative convolution involving a Gaussian kernel with a small variance, wherein the estimated defocus amount is determined using a lookup table, further wherein the lookup table is based on a curve related to a relationship between blur radius and iteration number; and
focusing the camera device based on the estimated defocus amount of the image; and
a processing component coupled to the memory, the processing component configured for processing the application.

18. The camera device of claim 17 wherein the application is configured for detecting a focus of the lens of the image.

19. The camera device of claim 18 wherein detecting the focus of the image comprises comparing an iteration number with a predefined threshold.

20. The camera device of claim 19 wherein the image is in focus when the iteration number is smaller than the threshold.

21. The camera device of claim 17 wherein the application is configured for denoising the image.

* * * * *